March 19, 1929. V. BENDIX 1,705,850
BRAKE
Filed Sept. 2, 1925 2 Sheets-Sheet 1
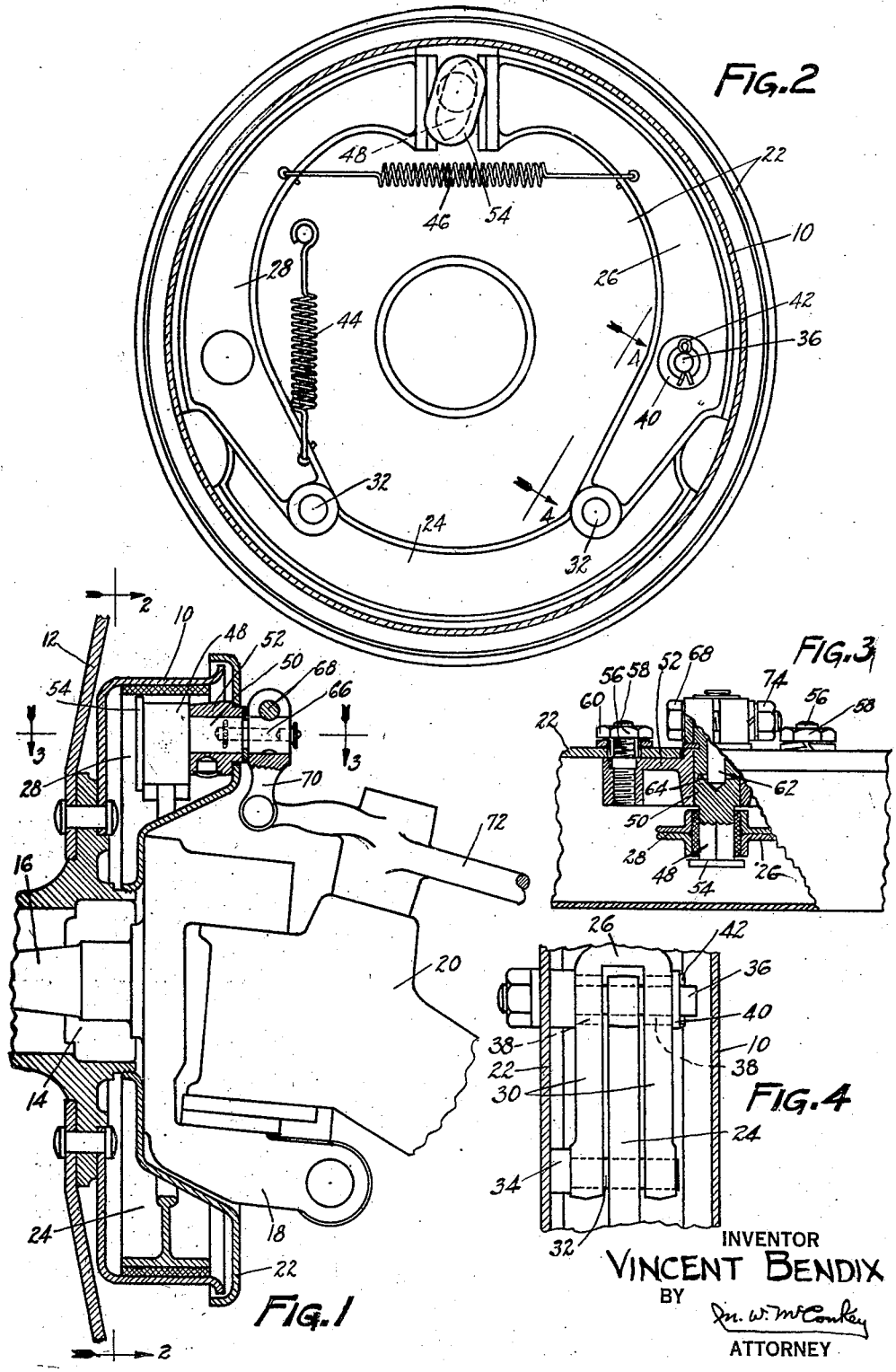
INVENTOR
VINCENT BENDIX
BY
M. W. McConkey
ATTORNEY March 19, 1929. V. BENDIX 1,705,850
BRAKE
Filed Sept. 2, 1925  2 Sheets-Sheet 2
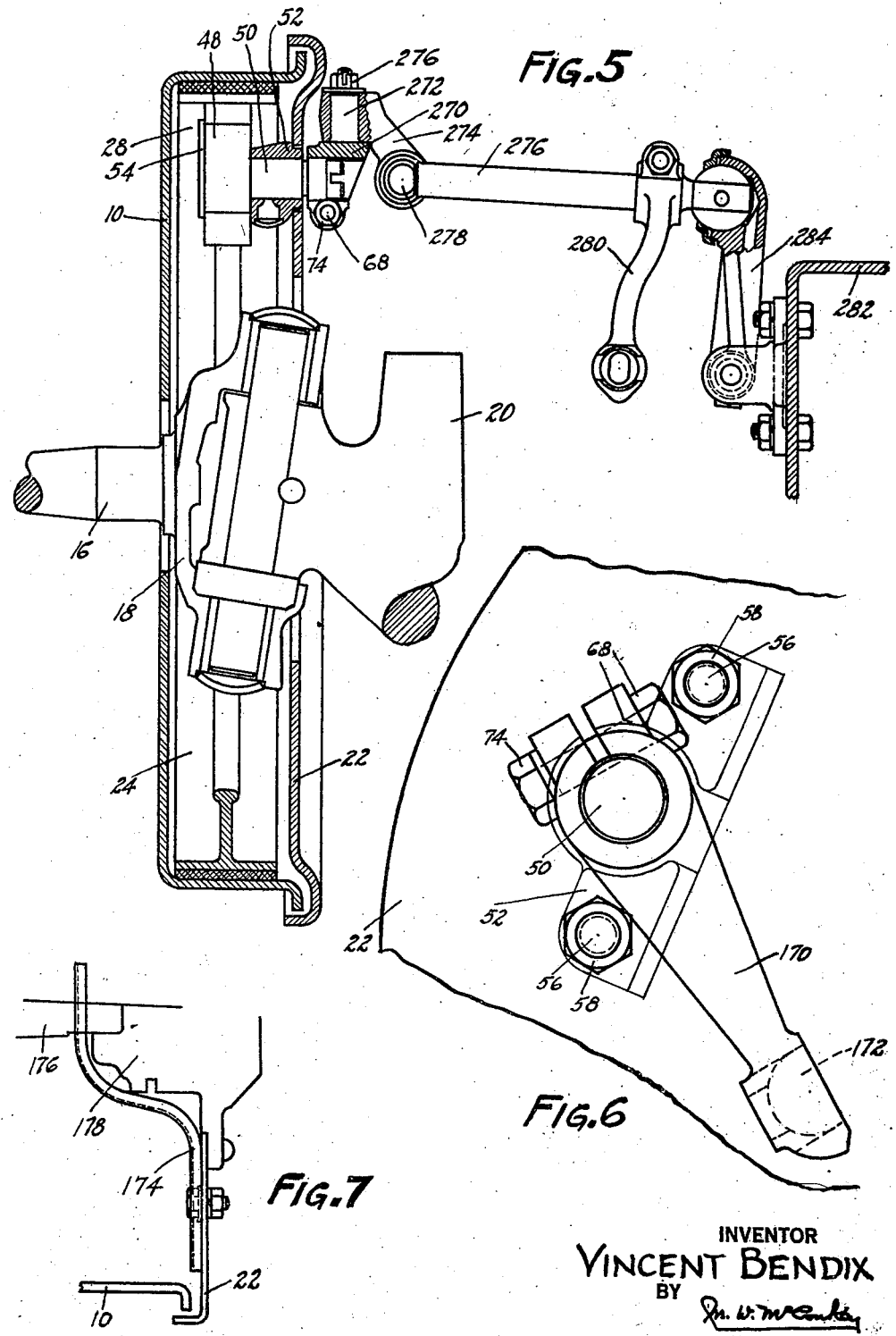

Patented Mar. 19, 1929.

1,705,850

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE.

Application filed September 2, 1925. Serial No. 54,049.

This invention relates to brakes, and is illustrated as embodied in an automobile chassis with its front and rear brakes.

An important object of the invention is to arrange the parts of the brake-applying mechanism of a front or other swivelled wheel, to permit interchangeable use of either of two different types of controls, so that a customer may take his choice with a minimum of trouble in making the change.

The first of the controls shown is of the type in which a crank on the brake-applying shaft is engaged by operating means, such as a generally horizontal lever, with the joint movable in applying the brake from an idle position spaced from the swivelling axis to an active position substantially in that axis. When such a lever is used to operate the crank, the control may conveniently be designated a "crank-and-lever" control.

The other illustrated control is of the type including a floating operating shaft universally and movably supported on the chassis frame at its inner end. At its outer end the floating shaft is universally jointed to the brake-applying shaft, substantially at the swivelling axis of the wheel, by means such as a yoke horizontally pivoted to the end of the floating shaft and having a part sleeved on a vertical pivot pin portion of a novel crank arm on the end of the brake-applying shaft.

Other features of the invention relate to novel means clamping in place the bracket carrying the brake cam, or its equivalent, to permit the bracket to shift when the brake is applied, to center the cam; to a shoe-positioning arrangement including a shoe-embracing flange on the brake cam; to a novel single anchor for a three-shoe assembly; to a clamping bolt for a brake-applying arm serving as an adjusting device to turn the arm on its shaft; and to other novel combinations of parts and desirable particular constructions which will be apparent from the following description of the arrangements illustrated in the accompanying drawings, in which:

Fig. 1 is a vertical section through one front brake and associated parts, showing a crank-and-lever control in rear elevation;

Fig. 2 is a section through the brake on the line 2—2, Fig. 1, showing the shoes in side elevation;

Fig. 3 is, on the right, a top plan view, and on the left, a horizontal section on the line 3—3 of Fig. 1, showing the arrangement permitting the bracket to shift to center the cam;

Fig. 4 is a section on the line 4—4 of Fig. 2, showing the ends of two of the shoes in elevation, looking outward radially of the drum;

Fig. 5 is a view corresponding to Fig. 1, but showing the other or chassis-supported control;

Fig. 6 is a partial inside elevation of one of the rear wheel brakes, showing an arm which is there used to rock the brake-applying shaft; and Fig. 7 is a vertical section through the bottom of one of the rear brakes, illustrating a device for preventing oil from dripping from the end of the axle on to the brake shoes.

In the arrangement of Fig. 1, a brake drum 10 rotates with a wheel 12 rotatably mounted by ball bearings 14 on the spindle 16 of a knuckle 18 swivelled, by means such as the usual king pin, to one end of the front axle 20. The knuckle 18 also carries a stationary support such as a backing plate 22 closing the open side of the drum.

Between drum 10 and the backing plate 22 is arranged the friction means, shown as including a central shoe 24, a reverse end shoe 26, and a floating forward end shoe 28. Each of the two end shoes 26 and 28 is forked to provide arms 30 (Fig. 4) straddling one end of the central shoe 24. A pivot pin 32 passing through alined openings in each pair of arms 30 and in the central web of shoe 24, serves as a pivotal connection between the shoes. Preferably each pin 32 is smooth, and is held in the alined openings only by sliding engagement of its head 34 with the backing plate 22, thus facilitating assembly of the shoes.

At its end on the rear side of the brake, the central shoe 24 is anchored by having a part pivotally sleeved on an anchor or post 36 projecting from the backing plate 22 through relatively large openings 38 in arms 30 of shoe 26. Shoe 26 prevents shoe 24 from moving axially of the anchor, and shoe 26 is held by a washer 40 and cotter pin 42 on the end of the anchor.

Return springs 44 and 46 urge the shoes away from the drum, and are overcome in applying the brake by means such as a double cam 48 having a shaft 50 journalled in a bracket 52. The free ends of shoes 26 and 28 are confined laterally between bracket 52 and a flange 54 on cam 48. It will be seen that, with the wheel and drum removed and return spring 44 disconnected at one end, shoes 26 and 28 may be swung outwardly to disconnect them from flange 54, whereupon by removing cotter pin 42, the whole three-shoe assembly may be removed as a unit.

Bracket 52 carries threaded studs or bolts 56 projecting through larger openings in backing plate 22, the bracket being yieldably clamped to the backing plate 22 by nuts 58 threaded on the studs and compressing springs or washers 60 (Fig. 3). Each nut 58 is shown with a shoulder projecting through the opening in the backing plate and seating against bracket 52, thus predetermining the pressure on springs 60 and preventing unintentional locking of the bracket to the backing plate. By this arrangement, ordinarily bracket 52 is immovable, but in case of uneven wear of the brake lining, the reaction from cam 48 when the brake is applied is sufficiently powerful to shift the bracket to center the cam.

In order to lubricate the bearing surfaces of shaft 50 and bracket 52, shaft 50 may have an axial passage 62 (Fig. 3) opening outside the backing plate and having any suitable lubricant fitting, and intersected by a cross passage 64 extending diametrically entirely through the shaft, and shown plugged with wicking.

Shaft 50 terminates approximately in the swivelling axis of the wheel, and is formed with a worm thread 66 (Fig. 1) near its end meshing with a thread on a clamping bolt 68 passing loosely through the opposite sides of the split hub of a crank or arm 70 sleeved on the end of the shaft. By rotating bolt 68 about its axis, crank 70 may be turned angularly with respect to shaft 50, to adjust with respect to the swivelling axis of the wheel the active position of its ball end, which is operatively engaged by a vertical plane surface on the end of a generally horizontal brake-operating lever 72 fulcrumed between its ends on the axle 20. Any desired adjustment of lever 70 is preserved by tightening up a nut 74 on bolt 68. This construction is claimed in my application No. 106,307, filed May 3, 1926.

When the brake is applied by the above-described connections, the joint between lever 72 and crank 70 is moved substantially horizontally forward from an idle position spaced behind the swivelling axis of the wheel to an active position substantially in that axis. A control of this character may conveniently be designated a "crank-and-lever" control. If it is desired to relieve the pressure on the outer brake on a turn, the two front brakes are not equalized, and the active position of the joint between lever 72 and crank 70 is not exactly in the swivelling axis, but is spaced a fraction of an inch from that axis toward the wheel, as explained in my prior application No. 26,036, filed April 27, 1925.

When used on a rear wheel, an arm 170 (Fig. 6) is substituted for the arm 70, being somewhat longer, and having in its end a semispherical recess 172 for a corresponding base on a nut threaded on the brake rod or other connection. In the rear brake, it is especially important to prevent lubricant from leaking from the axle housing on to the brake shoes. To prevent this, I prefer to fasten to the backing plate 22 a flaring stamping 174 (Fig. 7) cut out to encircle closely the driving hub part 176 just beyond the end of the usual casting 178 which is carried by the end of the axle housing.

One of the important features of the invention relates to providing a control of the chassis-supported or "Perrot" type which is interchangeable with the crank-and-lever control and with the rear brake control described above. This novel interchangeable control is shown in Fig. 5.

In this case, there is clamped on the end of shaft 50, by the same adjusting and clamping bolt 68, an upwardly-extending crank arm 270, having a cylindrical pivot pin portion 272. This arm is so arranged on the shaft that, when the brake is applied, the axis of portion 272 is substantially vertical, and in a vertical plane including the axis of the spindle 16 and the swivelling axis of the wheel.

A yoke or other connecting member 274 has an upper part formed with a cylindrical bearing sleeved on the pivot pin portion 272 of crank arm 270, and held by a nut 276, this constituting the vertical part of a novel universal joint. The horizontal part is formed by pivoting yoke 274 to a horizontal floating shaft 276, by a horizontal pivot 278. Pivot 278 may be a separate member, or may be formed integrally on yoke 274 and project into an opening in the end of the floating shaft 276, or it may be formed by bending the shaft at right angles and journalling the bent end in a sleeve formed in yoke 274.

The inner end of shaft 276 carries an operating arm 280, connected in any desired manner to the pedal or other operating means, and is movably and universally supported on the chassis frame 282 by a ball-and-socket connection with an arm 284 pivoted on the chassis frame.

If the front brakes are not equalized, and since the axis of portion 272 of the universal joint is at an acute angle to the inclined swivelling axis of the wheel, the pressure on the outer brake will automatically be relieved on a turn, in the manner usual with Perrot controls.

By the above-described arrangement, it will be seen that the improved brake can be used without change with either a rear control, a crank-and-lever control, or a Perrot control. It is even possible, by providing bosses on all the front axles for levers 72, and by punching all the frames for the brackets carrying arms 284, to give any particular car buyer his same car with either the crank-and-lever or Perrot control, as he prefers. It is not my intention to limit the scope of the invention to the particular constructions described above, or otherwise than by the terms of the appended claims.

I claim:

1. In a brake having a rotatable drum and an adjacent stationary support, operating mechanism including a shaft journalled in said support, an axial lubricant passage opening at the end of the shaft outside the drum, a cross passage through the shaft intersecting the axial passage and supplying lubricant to the bearing surfaces of the shaft and support, and an operating arm on the shaft outside the drum arranged to leave the end of the axial lubricant passage unobstructed.

2. A one-piece cam and shaft including a cylindrical shaft portion having a worm thread near one end, a cam portion at the other end of the shaft portion, and a flange at the extreme end of the cam portion away from the shaft portion.

3. A one-piece cam and shaft including a cylindrical shaft portion having a worm thread near one end, a cam portion at the other end of the shaft portion, in combination with an arm having a split hub encircling the threaded part of said shaft portion, and a clamping bolt for the split hub having a worm thread meshing with the thread of the shaft portion and rotatable to adjust the arm angularly on the shaft.

4. A brake comprising, in combination, a drum, a backing plate, friction means between the drum and backing plate having adjacent free ends, a cam between the free ends having a shaft extending through a relatively large opening in the backing plate, a bracket in which the shaft is journalled having clamping parts extending through relatively large openings in the backing plate, and nuts threaded on said parts to clamp the bracket to the backing plate, the nuts having shoulders passing through said openings and engaging the bracket to give a predetermined limited clamping pressure permitting the bracket to shift slightly, when the brake is applied, to center the cam.

5. A brake comprising, in combination, a drum, a backing plate, friction means between the drum and backing plate having adjacent free ends, expanding means engaging the free ends having a shaft extending through a relatively large opening in the backing plate, a bracket in which the shaft is journalled having clamping parts extending through relatively large openings in the backing plate, and nuts threaded on said parts to clamp the bracket to the backing plate, the nuts having shoulders passing through said openings and engaging the bracket to give a predetermined limited clamping pressure permitting the bracket to shift slightly, when the brake is applied, to center said means.

6. A brake comprising, in combination, a pair of shoes, one of which is forked to form arms straddling the other, a pivot connecting the forked end of the one shoe to the other shoe between its ends, an anchor for the straddled end of the other shoe passing through relatively large openings in said arms, and means on the end of said anchor engaging the outer one of said arms to position both shoes laterally and prevent them from moving axially of the anchor.

7. A brake comprising, in combination, a pair of shoes, one of which is formed to overlap the other, a pivot connecting the overlapping end of the one shoe to the other shoe between its ends, an anchor for the overlapped end of the other shoe passing through a relatively large opening in said overlapping shoe, and means on the end of said anchor engaging said overlapping shoe to position both shoes laterally and prevent them from moving axially of the anchor.

8. A brake assembly comprising, in combination, a backing plate, a brake shoe anchored on said plate, another brake shoe forked to form arms straddling the anchored end of the first shoe, and a pivot pin connecting the ends of the arms to said anchored shoe between its ends and having a head slidably engaging the backing plate.

9. A brake assembly comprising, in combination, a backing plate, a brake shoe anchored on said plate, another brake shoe formed to overlap the anchored end of the first shoe, and a pivot pin connecting the end of the overlapping shoe to said anchored shoe between its ends and having a head slidably engaging the backing plate.

10. A single-anchor three-shoe brake comprising, in combination, a central shoe anchored at one end, a pair of end shoes pivotally connected to the central shoe adjacent its opposite ends to form a connected assembly, and a cam between the free ends of the end shoes having a flange confining said ends laterally, the assembly of three shoes being removable by swinging the end shoes free of the cam flange and disengaging the central shoe from its anchor.

11. A single-anchor three-shoe brake comprising, in combination, a central shoe anchored at one end, a pair of end shoes each forked to form arms straddling one end of the central shoe, the arms being pivotally connected to the central shoe between its ends to form a connected assembly, and a cam between the free ends of the end shoes having a flange confining said ends laterally, the assembly of three shoes being removable by swinging the end shoes free of the cam flange and disengaging the central shoe from its anchor.

12. A single-anchor three-shoe brake comprising, in combination, a backing plate, a cylindrical anchor member projecting from the backing plate, a central shoe having one end pivotally sleeved on said anchor, a pair of end shoes overlapping opposite ends of the central shoe, the end shoe at the anchored end of the central shoe having a relatively large opening through which the end of the anchor projects, means on the end of the anchor engaging the side of said end shoe to prevent movement of the shoes axially of the anchor, and pivots connecting the end shoes to the central shoe between its ends.

13. A single-anchor three-shoe brake comprising, in combination, a backing plate, an anchor member carried by the backing plate, a central shoe having one end pivotally sleeved on said anchor, a pair of end shoes overlapping opposite ends of the central shoe, and pivots connecting the end shoes to the central shoe between its ends and having heads slidably engaging the backing plate.

14. A vehicle having a swivelled wheel with a brake, and comprising, in combination therewith, a brake-applying device, a support swivelling with the wheel, a bracket carrying the brake-applying device and clamped to the support lightly enough to permit the bracket to shift when the brake is applied to center the brake-applying device, an arm carried by the bracket and operating said device and having a part movable in applying the brake from an idle position spaced from the swivelling axis to an active position substantially in that axis, and brake-applying means engaging said part of the arm.

15. A brake comprising, in combination, friction means having adjacent free ends, a support, a brake-applying device engaging said ends, a bracket carrying the brake-applying device, and means for yieldingly clamping the bracket to the support to permit it to shift when the brake is applied to center the brake-applying device.

16. A brake comprising, in combination, friction means having adjacent free ends, a support, a brake-applying device engaging said ends, a bracket carrying the brake-applying device, and means for yieldingly clamping the bracket to the support to permit it to shift when the brake is applied to center the brake-applying device, said means including springs and devices compressing the springs including stops predetermining the pressure on the springs.

17. A brake comprising, in combination, friction means having adjacent free ends, a support, a brake-applying device engaging said ends, a bracket carrying the brake-applying device and having threaded members projecting through relatively large openings in the support, springs sleeved on said members, and nuts threaded on said members and compressing the springs, the bracket being shiftable when the brake is applied automatically to center the brake-applying device.

In testimony whereof I have hereunto signed my name.

VINCENT BENDIX.